(12) United States Patent
Miwa (10) Patent No.: US 10,882,360 B2
(45) Date of Patent: Jan. 5, 2021

(54) TIRE FOR RUNNING ON ROUGH TERRAIN

(71) Applicant: Sumitomo Rubber Industries, Ltd., Kobe (JP)

(72) Inventor: Takuya Miwa, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 332 days.

(21) Appl. No.: 15/806,140

(22) Filed: Nov. 7, 2017

(65) Prior Publication Data

US 2018/0126791 A1   May 10, 2018

(30) Foreign Application Priority Data

Nov. 8, 2016 (JP) ................................ 2016-218230

(51) Int. Cl.
*B60C 11/03* (2006.01)
*B60C 11/11* (2006.01)

(52) U.S. Cl.
CPC ...... *B60C 11/0332* (2013.01); *B60C 11/0302* (2013.01); *B60C 11/0306* (2013.01); *B60C 11/0311* (2013.01); *B60C 11/11* (2013.01); *B60C 2011/0313* (2013.01); *B60C 2200/10* (2013.01); *B60C 2200/14* (2013.01)

(58) Field of Classification Search
CPC . B60C 11/0332; B60C 11/11; B60C 11/0302; B60C 11/0306; B60C 11/0311; B60C 2200/10; B60C 2200/14; B60C 2011/0313
See application file for complete search history.

(56) References Cited

U.S. PATENT DOCUMENTS

| 5,669,993 | A  | * | 9/1997 | Moseley | ................. B60C 11/11 |
|           |    |   |        |         | 152/209.1 |
| 2013/0263986 | A1 | * | 10/2013 | Hikita | ................. B60C 11/1384 |
|           |    |   |        |         | 152/209.1 |
| 2013/0306207 | A1 |   | 11/2013 | Matsumura | |

FOREIGN PATENT DOCUMENTS

| EP | 2423006 A1 | 2/2012 |
| EP | 2664465 A1 | 11/2013 |
| JP | 2007-112396 A | 5/2007 |
| JP | 2007112396 A * | 5/2007 |
| JP | 2013-241062 A | 12/2013 |
| WO | WO 00/26040 A1 | 5/2000 |

OTHER PUBLICATIONS

Machine English Translation of JP-2007112396 (Year: 2007).*
Extended European Search Report for Application No. 17198425.5, dated Mar. 19, 2018.

* cited by examiner

*Primary Examiner* — Alison L Hindenlang
*Assistant Examiner* — Olukorede Esan
(74) *Attorney, Agent, or Firm* — Birch, Stewart, Kolasch & Birch, LLP (57) ABSTRACT

A tire for running on rough terrain for which an intended tire rotational direction is specified, comprises: a tread portion 2 provided with a first block 11 having a ground contacting top surface 16, and a base cross sectional shape 17. The ground contacting top surface 16 has a polygonal shape having a heel-side oblique edge 21 inclined with respect to the tire axial direction. The base cross sectional shape 17 is a polygon having a heel-side axial edge 22 extending in the tire axial direction. In the top view of the first block, an angle θa formed between the heel-side oblique edge 21 and the heel-side axial edge 22 is in a range from 5 to 45 degrees.

3 Claims, 6 Drawing Sheets

TIRE FOR RUNNING ON ROUGH TERRAIN

TECHNICAL FIELD

The present invention relates to a tire for running on rough terrain, more particularly to a tread block capable of improving the traction performance of the tire and the durability of the block during cornering.

BACKGROUND ART

Japanese Patent Application Publication No. 2013-241062 discloses a motorcycle pneumatic tire for running on rough terrain, wherein the tread portion is provided with blocks whose ground contacting top surfaces are polygonal. In such off-road tire, the blocks dig into the ground when running on rough terrain, and generate a large gripping force. In the conventional general blocks, the contour shape of the ground contacting top surface of the block is similar to the cross sectional shape at the base of the block, and it is difficult to improve the durability of the block and the traction performance during cornering in good balance.

For example,
In order to focus on an improvement in the traction performance during cornering of the tire having the above-mentioned conventional general blocks, it is conceivable to incline, with respect to the tire axial direction, the heel-side edge in the intended tire rotational direction of the ground contacting top surface. In this case, an edge of the cross sectional shape at the base of the block, which corresponds to the heel-side edge of the ground contacting top surface, is also inclined with respect to the tire axial direction. As a result, when running on rough terrain, large stress is likely to occur on both end portions of the edge of the base of the block, and thus, damage starting from the end portions tends to easily occur.

SUMMARY OF THE INVENTION

It is therefore, an object of the present invention to provide a tire for running on rough terrain in which the traction performance and the durability of blocks during cornering can be improved in good balance.

According to the present invention, a tire for running on rough terrain for which an intended tire rotational direction is specified, comprises:

a tread portion provided with a first block having a ground contacting top surface and a base cross sectional shape which is the shape of the first block at the base of the first block in a cross section being parallel with the ground contacting top surface, wherein the ground contacting top surface has a polygonal shape having a heel-side oblique edge inclined with respect to the tire axial direction, the base cross sectional shape is a polygon having a heel-side axial edge extending in the tire axial direction, and in the top view of the first block, an angle $\theta a$ formed between the heel-side oblique edge and the heel-side axial edge is in a range from 5 to 45 degrees.

It is preferable that the polygonal shape of the ground contacting top surface and the polygon of the base cross sectional shape are the same in the number of sides, and the first block has a portion twisted gradually from the ground contacting top surface toward the radially inside.

It is preferable that a first cross section of the first block being parallel with the ground contacting top surface at 1/3 of the height of the first block, and a second cross section of the first block being parallel with the ground contacting top surface at 2/3 of the height of the first block respectively have polygonal shapes which are the same in the number of sides as the base cross sectional shape.

It is preferable that the first block has a heel-side side surface which extends from the heel-side oblique edge to the heel-side axial edge, while defining a first virtual edge of the first cross section in the heel-side side surface and a second virtual edge of the second cross section in the heel-side side surface, and in the top view of the first block,
the first virtual edge is inclined with respect to the heel-side axial edge at an angle $\theta b$ smaller than the angle $\theta a$, the second virtual edge is inclined with respect to the heel-side axial edge at an angle $\theta c$ smaller than the angle $\theta a$ and large than the angle $\theta b$, and the difference $\theta c - \theta b$ of the angle $\theta c$ from the angle $\theta b$ is greater than the angle $\theta b$.

It is preferable that the difference $\theta a - \theta c$ of the angle $\theta a$ from the angle $\theta c$ is greater than the difference $\theta c - \theta b$.

It is preferable that the difference $\theta c - \theta b$ and the difference $\theta a - \theta c$ are not more than 10 degrees.

Therefore, in the tire according to the present invention, as the ground contacting top surface of the first block has the heel-side oblique edge, a higher traction can be expected during cornering. Further, as the base cross sectional shape of the first block has the heel-side axial edge, the ends of the heel-side axial edge are prevented from a large stress, and the first block exhibits excellent durability.

Further, as the angle $\theta a$ between the heel-side oblique edge and the heel-side axial edge is limited, it is possible to further improve the traction performance and the block durability during cornering in good balance.

DESCRIPTION OF THE PREFERRED EMBODIMENTS

Embodiments of the present invention will now be described with reference to the accompanying drawings.

In the drawings, a tire for running on rough terrain according to the present invention is a pneumatic tire. As well known in the art, a pneumatic tire comprises a tread portion 2 whose radially outer surface defines the tread, a pair of axially spaced bead portions mounted on rim seats, a pair of sidewall portions extending between the tread edges and the bead portions, a carcass 6 extending between the bead portions through the tread portion and the sidewall portions, and a tread reinforcing belt 7 disposed radially outside the carcass 6 in the tread portion.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflated to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load Capacity" in ETRTO, the maximum value given in the above-mentioned table in TRA or the like.

Figure 1:
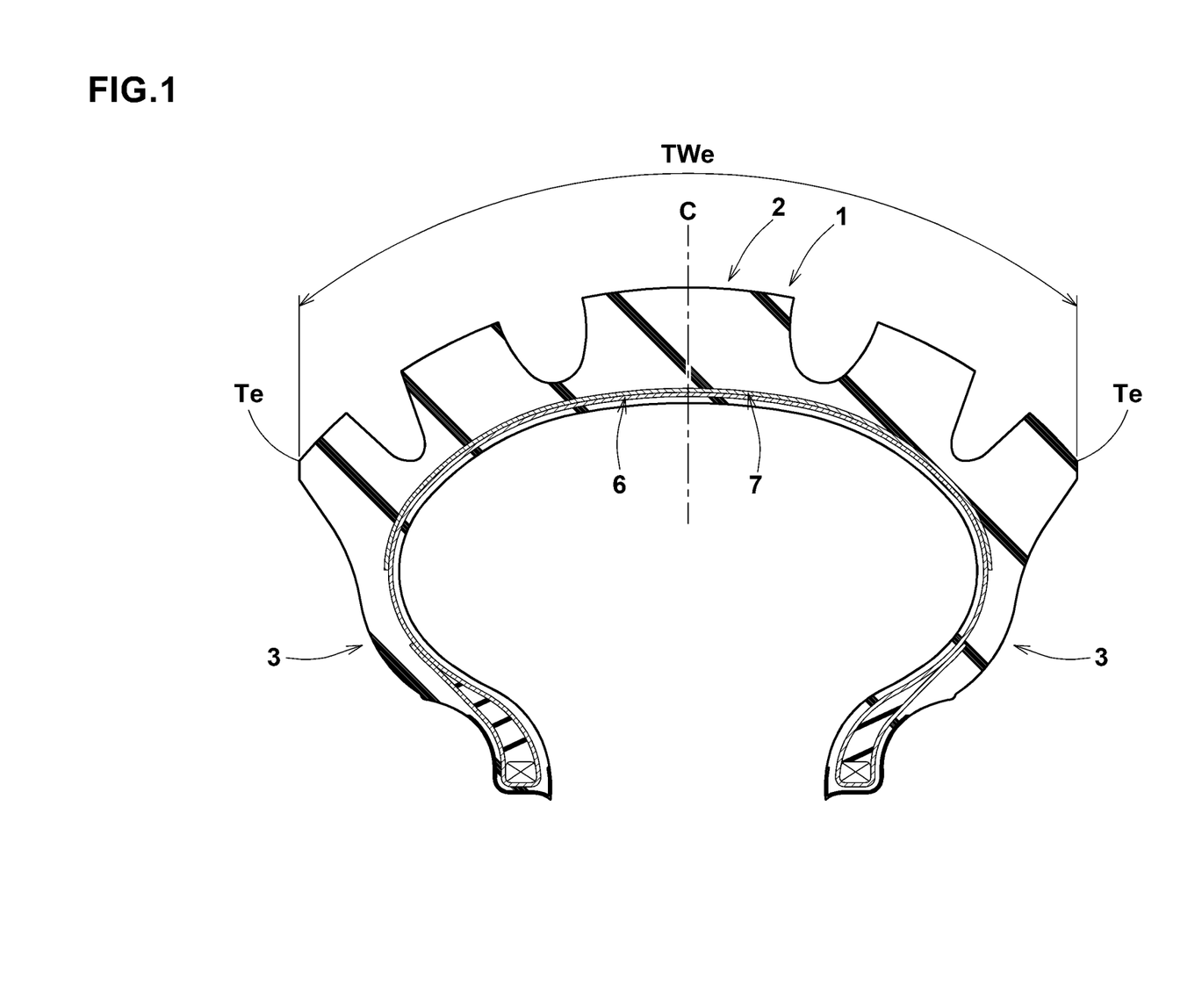
FIG. 1 is a cross-sectional view showing a tire for running on rough terrain as an embodiment of the present invention.

FIG. 1 shows a pneumatic tire 1 for motorcycle as an embodiment of the present invention under the normally inflated unloaded condition.
In the present embodiment, the tire 1 for running on rough terrain is designed for use in a motocross race.

The tread portion 2 of the tire 1 is, as shown in FIG. 1, curved convexly toward the radially outside, and the radially outer surface has an arcuate tread profile in the cross section of the tire.

The present invention is however, not limited to such motorcycle tire. The present invention can be applied to tires for a three-wheeled buggy, four-wheeled vehicle and the like. Further, the present invention may be applied to airless tires.

The tire 1 comprises reinforcing cord layers including the carcass 6 and the tread reinforcing belt 7. For such reinforcing cord layers, known configurations may be employed as appropriate.

Figure 2:
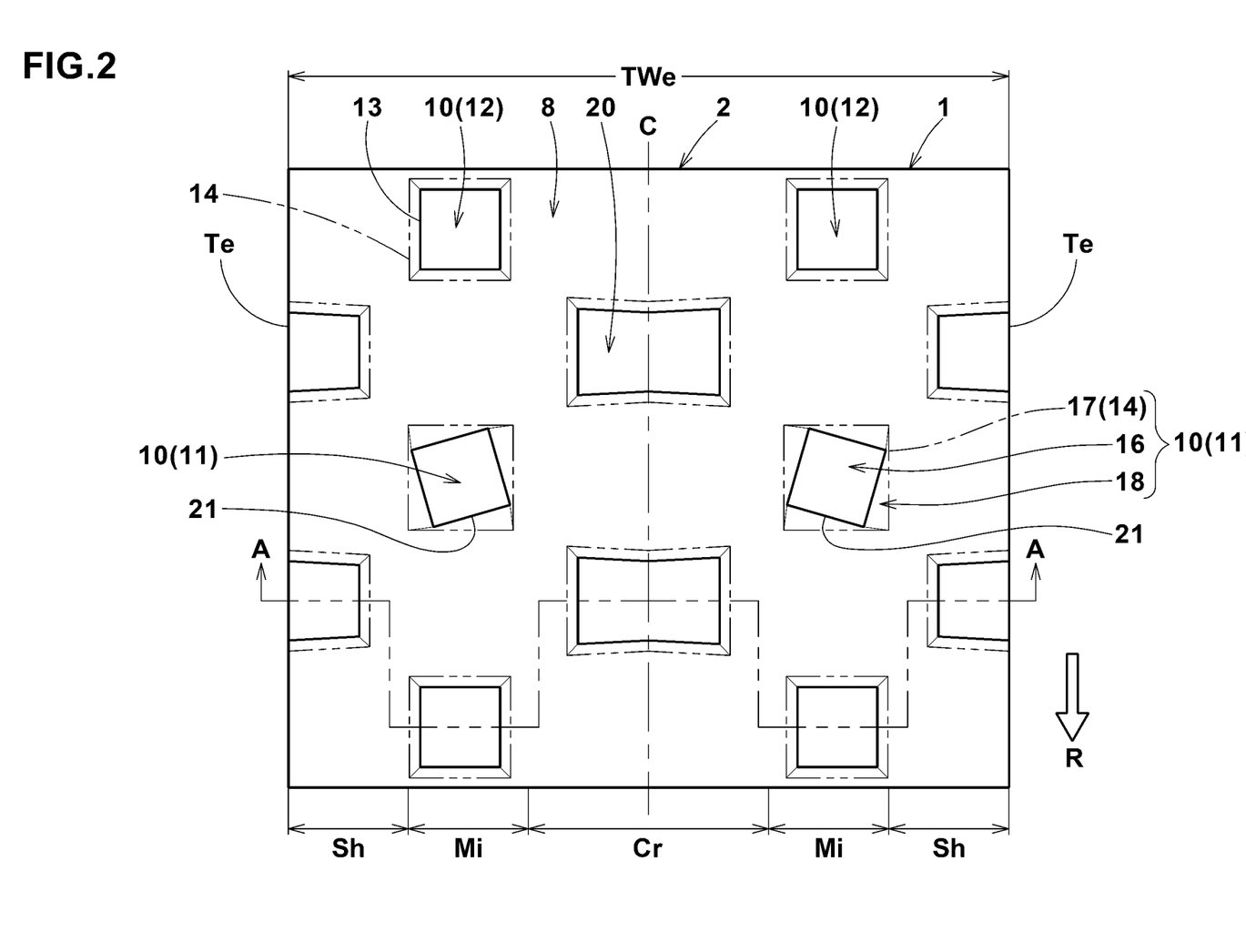
FIG. 2 is a development partial view of the tread portion of the tire shown in FIG. 1.

The tread portion 2 is provided with a directional tread pattern for which an intended tire rotational direction R is specified as shown in FIG. 2. The intended tire rotational direction R is indicated in the sidewall portions 3 by the use of letters or symbol for example.

The tread portion 2 is provided with a plurality of blocks 10 defining the tread pattern. Each of the blocks 10 is raised radially outwardly from the bottom surface 8 of the tread portion 2, and its radially outer surface forms the ground contacting top surface.

The tread portion 2 has
a crown region Cr centered on the tire equator C and having a width of ⅓ of the developed tread width Twe,
a pair of shoulder regions sh extending toward the tire equator c from the respectively tread edges Te and each having a width of ⅙ of the developed tread width Twe, and
a pair of middle regions Mi defined between the crown region Cr and the shoulder regions sh and each having a width of ⅙ of the developed tread width Twe.
The developed tread width Twe is the axial distance between the tread edged Te of the tread portion 2 when developed. Here, the tread edges Te are defined by the axially outermost edges of the axially outermost blocks 10.

In FIG. 2, for the sake of easy understanding, edges (13) of the ground contacting top surface of the block 10 are indicated by solid line,
edges of side wall surfaces of the block 10 respectively extending from the edges (13) of the ground contacting top surface to the bottom surface 8 are indicated by thin solid line than the solid line indicating the edges (13), and
edges (14) (the boundary between the side wall surfaces of the block 10 and the bottom surface 8) of the base cross sectional shape of the block 10 are indicated by two-dot chain line.

The blocks 10 include first blocks 11.
In the first block 11, the ground contacting top surface denoted by 16 has a polygonal shape, the base cross sectional shape denoted by 17 is a polygonal shape, and the side wall surfaces are denoted by 18.

The polygonal shape of the ground contacting top surface 16 and the polygonal shape of the base cross sectional shape 17 are the same in the number of sides (or edges).

Preferably, the polygonal shape of the ground contacting top surface 16 and the polygonal shape of the base cross sectional shape 17 are substantially similar figures.

Figure 3:
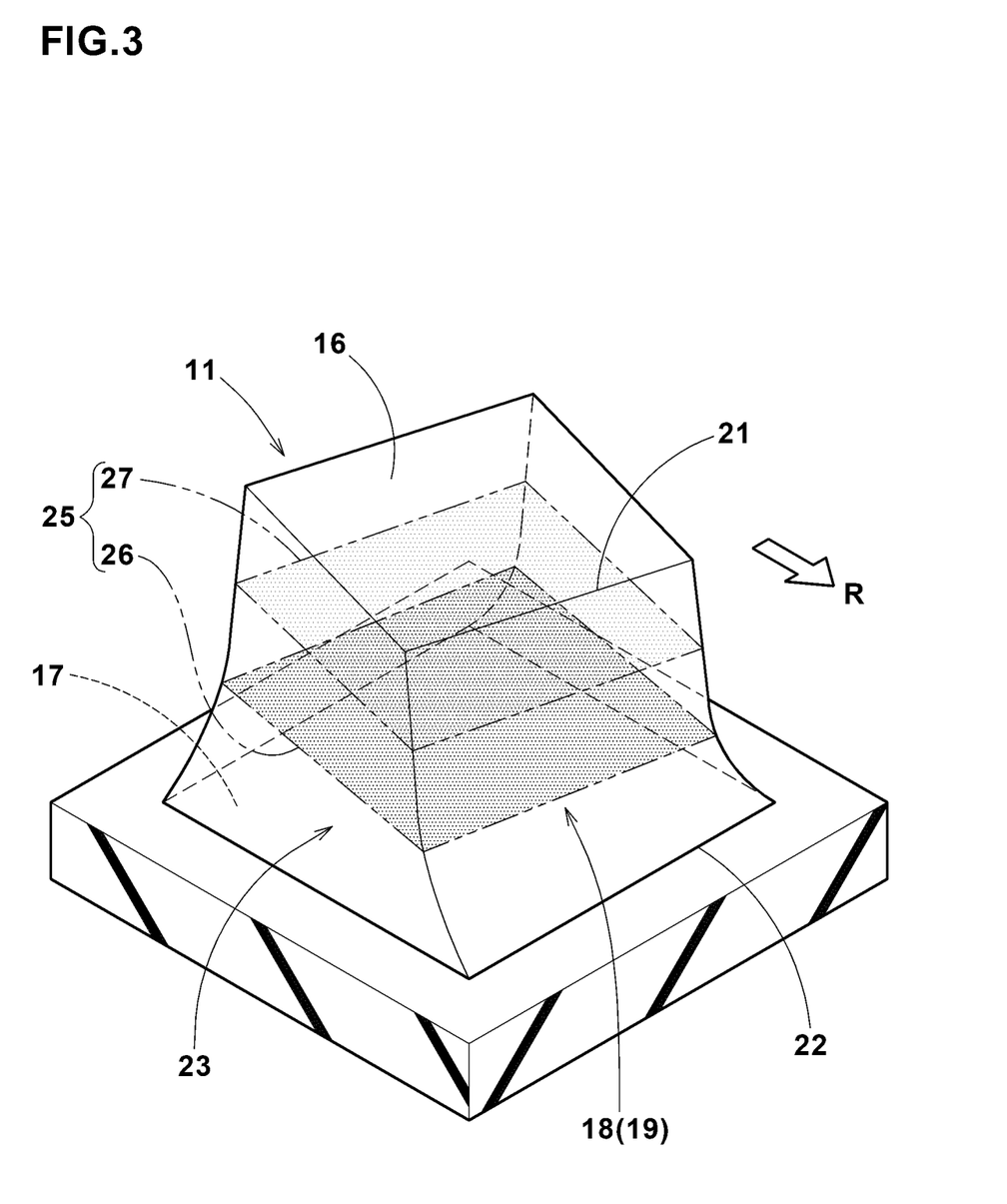
FIG. 3 is an enlarged perspective view of the first block.
Figure 4:
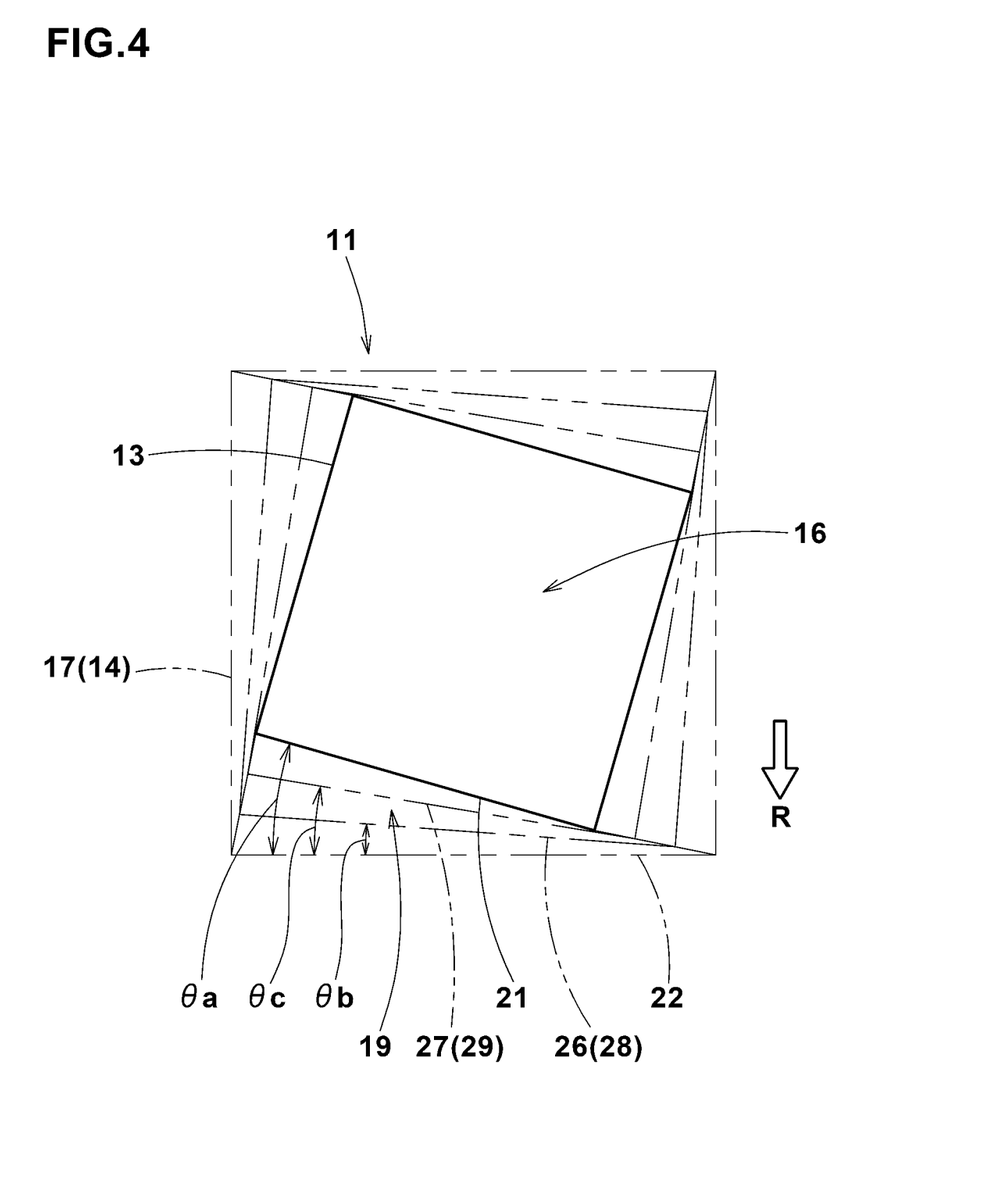
FIG. 4 is a top view of the first block.

As shown in FIGS. 3 and 4, in the present embodiment, the polygonal shape of the ground contacting top surface 16 and the polygonal shape of the base cross sectional shape 17 are rectangular, preferably square. The polygonal shapes are however, not limited to rectangles.

As shown in FIG. 3, the ground contacting top surface 16 has a heel-side edge 21 (front edge) in the intended tire rotation direction R which is inclined with respect to the tire axial direction. And the base cross sectional shape 17 has a heel-side edge 22 extending in parallel with the tire axial direction. The heel-side side wall surface 19, which is one of the side wall surfaces 18, extends from the heel-side oblique edge 21 to the heel-side axial edge 22, while being twisted.

During cornering, the heel-side oblique edge 21 of such first block 11 becomes closer to the perpendicular direction to the traveling direction of the tire and generates a large frictional force. As a result, a great traction can be expected during cornering. Further, as the heel-side axial edge 22 extends along the tire axial direction, a large stress is hard to occur on its both ends, and excellent block durability is exhibited.

As shown in FIG. 4, in the plan view, the angle θa between the heel-side oblique edge 21 and the heel-side axial edge 22 is set in a range of not smaller than 5 degrees, but not greater than 45 degrees, preferably not greater than 35 degrees, more preferably not greater than 25 degrees. Thus, it is possible to further improve the traction performance and block durability during cornering in good balance.

A portion 23 of the first block 11 from the ground contacting top surface 16 toward the radially inside of the tire is twisted as shown in FIG. 3. In the present embodiment, the twisted portion 23 reaches to the base of the first block 11. In the twisted portion 23, the shape of the block in its cross section 25 being parallel with the ground contacting top surface 16 is rotated gradually from the ground contacting top surface 16 toward the base of the block around an axis which perpendicularly intersects the ground contacting top surface.

In FIG. 3, the reference number 26 denotes the cross section 25 at ⅓ of the height of the first block 11 (hereinafter the first cross section 26), and
the reference number 27 denotes the cross section 25 at ⅔ of the height of the first block 11 (hereinafter the second cross section 27).

In FIG. 4, the shapes of the block in the first cross section 26 and the second cross section 27 and the base cross sectional shape 17 are indicated by two-dot chain line.

The shapes of the block in the first cross section 26 and the second cross section 27 are preferably polygonal shapes which are the same in the number of sides as the base cross sectional shape 17. In the present embodiment, the shapes of the block in the first cross section 26 and the second cross section 27 and the base cross sectional shape 17 are substantially similar figures.

It is preferable that the shapes of the block in the cross sections 25 being parallel with the ground contacting top surface 16 at any heights from the ground contacting top surface 16 to the base of the block are similar figurers.

In the first block 11, as the edges of the ground contacting top surface 16 are inclined in different directions than the respective edges of the base cross sectional shape 17, the block durability, the traction performance and mud discharging performance can be improved in good balance. Further, as the first block 11 is provided with smoothly curved (or twisted) side wall surfaces 18, it can exhibit excellent block durability.

As shown in FIG. 4, in the top view, a first virtual heel-side edge 28 of the first cross section 26 at the heel-side side wall surface 19 is inclined with respect to the heel-side axial edge 22 at an angle less θb which is smaller than the angle θa. Preferably, the angle θb is set in a range from 1.5 to 7.0 degrees.

In the top view, a second virtual heel-side edge 29 of the second cross section 27 at the heel-side side wall surface 19 is inclined with respect to the heel-side axial edge 22 at an angle θc which is larger than the angle θb and smaller than the angle θa. Preferably, the angle θc is set in a range from 3 to 15 degrees.

Preferably, the difference θc−θb between the angle θc and the angle θb is set to be greater than the angle θb. Thereby, the torsion of the block can be reduced on the radially inside of the first cross section 26, and damage to the base of the block can be suppressed.

It is preferable that the difference θa−θc between the angle θa and the angle θc is set to be greater than the difference θc−θb in order to increase the inclination of the heel-side oblique edge, while ensuring the durability of the base of the block.

It is desirable that the difference θc−θb and the difference θa−θc are set to be not more than 10 degrees. This suppresses excessive torsion of the block, and excellent block durability can be obtained.

As shown in FIG. 3, the area of the cross section 25 of the first block 11 gradually increases towards the radially inside of the tire. Thus, the rigidity of the base of the block is increased, and the durability of the block is further improved.

Preferably, the area S1 of the ground contacting top surface 16 is not less than 0.45 times, more preferably not less than 0.50 times, but preferably not more than 0.70 times, more preferably not more than 0.65 times the area S2 of the base cross sectional shape 17 in order to ensure the digging into the ground of the block, while maintaining the block durability.

It is preferable that, as shown in FIG. 4, in the top view, the edges 13 of the ground contacting top surface 16 are positioned within the area surrounded by the edges 14 of the base cross sectional shape 17.

If the edges 13 protrude from the area, there is a possibility that the block easily falls in the protruding direction when contacting with the ground, and the steering stability and block durability are deteriorated.

The first blocks 11 are preferably disposed in the middle regions Mi as shown in FIG. 2.

In the present embodiment, each of the middle regions Mi is provided with the first blocks 11 and second blocks 12 which are alternately arranged in the tire circumferential direction. The second block 12 is such that the edges 13 of the ground contacting top surface are respectively parallel with the edges 14 of the base cross sectional shape. In other words, the second block 12 is not twisted as is the first block 11.

In the present embodiment, the heel-side oblique edge 21 is inclined with respect to the tire axial direction to the opposite direction to the intended rotational direction R towards the tire equator c. Thereby, the first blocks 11 lead dirt and mud toward the crown blocks 20, and can provide a higher traction in cooperation with the crown blocks 20.

Figure 5A:
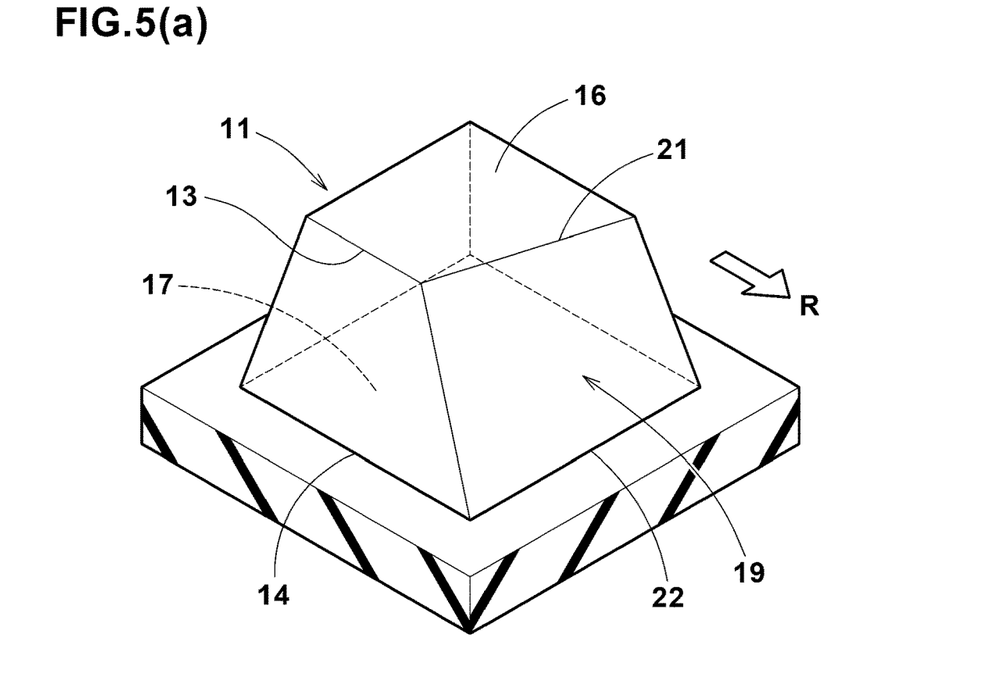
FIG. 5(a) is an enlarged perspective view of another example of the first block.
Figure 5B:
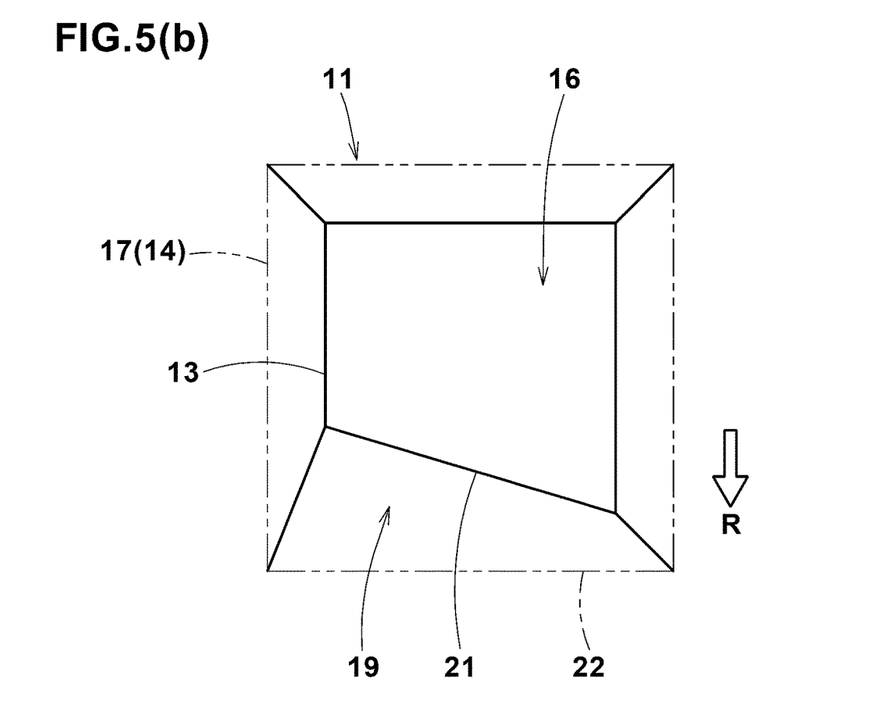
FIG. 5(b) is a top view thereof.

FIG. 5(a) shows another example of the first block 11. FIG. 5(b) is a top view thereof. In FIGS. 5(a) and 5(b), the same reference numbers are given to the components common to the former example.

In the example of FIGS. 5(a) and 5(b), except for the heel-side oblique edge 21 and the heel-side axial edge 22, the edges 13 of the ground contacting top surface 16 are respectively parallel with the edges 14 of the base cross sectional shape 17. Accordingly, the shape of the ground contacting top surface 16 and the base cross sectional shape 17 are different from each other. More specifically, the base cross sectional shape 17 is rectangular, and the ground contacting top surface 16 has a trapezoidal shape. And the heel-side side wall surface 19 extending between the heel-side oblique edge 21 and the heel-side axial edge 22 is flat and not twisted as in the former example.

Such first block 11 can exhibit a higher block durability, while increasing the traction during cornering.

While detailed description has been made of preferable embodiments of the present invention, the present invention can be embodied in various forms without being limited to the illustrated embodiment.

Comparison Tests

Figure 6:
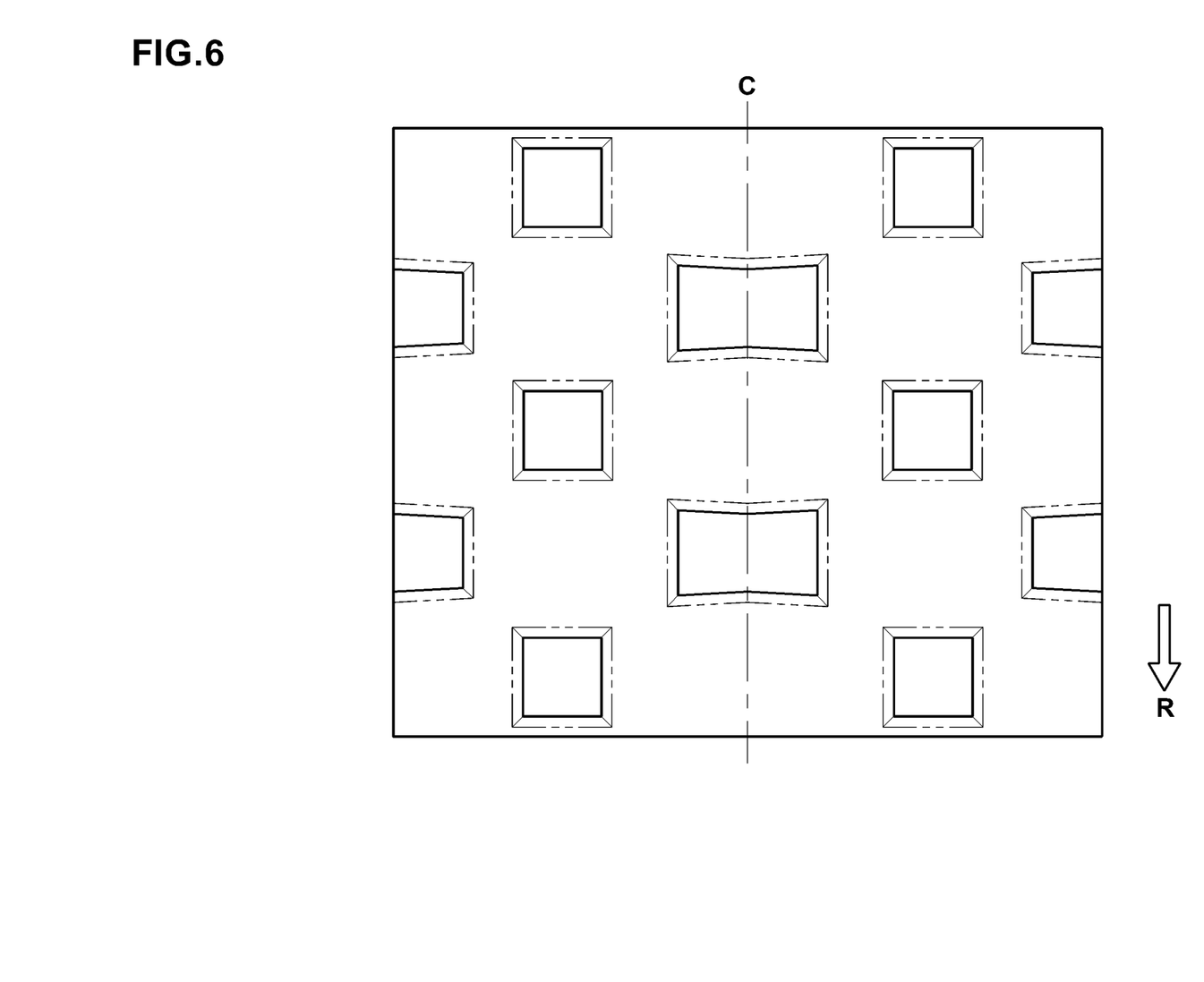
FIG. 6 is a development partial view of the tread portion of a tire for running on rough terrain as a comparative example.

Based on the tread pattern shown in FIG. 2, motorcycle tires of size 120/80-19 (rim size 2.15×19) were experimentally manufactured as test tires (Ex1-Ex11 and Ref1-Ref2), wherein the test tire Ref1 was provided with conventional blocks as shown in FIG. 6 instead of the first blocks 11.

The specifications of the test tires are shown in Table 1. Each test tire was tested for the traction performance and the block durability.

<Traction Performance Test>

Using a 450 cc motocross bike running on rough terrain, the test tires (tire pressure 80 kPa) were evaluated for the traction performance during cornering by a test rider.

The results are indicated in Table 1 by an index based on Ref1 being 100, wherein the larger the value, the better the traction performance during cornering.

<Block Durability Test>

Using a tire test drum (diameter 1.7 m), each test tire was run under the following conditions: tire pressure 80 kPa, vertical tire load 1.95 KN, and running speed of 50 km/h, until block chipping occurred, and the running distance was measured. The results are indicated in Table 1 by an index based on Ref1 being 100, wherein the larger the value, the better the block durability.

TABLE 1

| Tire | Ref1 | Ex1 | Ex2 | Ex3 | Ex4 | Ex5 | Ex6 |
|---|---|---|---|---|---|---|---|
| tread (Fig. No.) | 6 | 1 | 1 | 1 | 1 | 1 | 1 |
| angle θa (deg.) | 0 | 5 | 10 | 20 | 25 | 35 | 45 |
| angle θb (deg.) | 0 | 1.5 | 2.5 | 5 | 7 | 10 | 13 |
| angle θc (deg.) | 0 | 3 | 6 | 12 | 15 | 22 | 28 |
| traction performance | 100 | 105 | 107 | 106 | 105 | 105 | 104 |
| blocks durability | 100 | 104 | 103 | 103 | 102 | 101 | 101 |

| Tire | Ref2 | Ex7 | Ex8 | Ex9 | Ex10 | Ex11 |
|---|---|---|---|---|---|---|
| tread (Fig. No.) | 1 | 1 | 1 | 1 | 1 | 1 |
| angle θa (deg.) | 50 | 6 | 9 | 16 | 25 | 30 |
| angle θb (deg.) | 15 | 2 | 3 | 2 | 10 | 5 |
| angle θc (deg.) | 32 | 4 | 6 | 8 | 15 | 20 |
| traction performance | 102 | 106 | 107 | 106 | 105 | 105 |
| blocks durability | 100 | 102 | 102 | 104 | 101 | 101 |

From the test results, it was confirmed that, according to the present invention, the traction performance and the durability of the block can be improved in good balance.

DESCRIPTION OF THE REFERENCE SIGNS 2 tread portion
10 block
11 first block
16 ground contacting top surface
17 base cross sectional shape
18 side wall surface
21 heel-side oblique edge
22 heel-side axial edge

The invention claimed is:

1. A tire for running on rough terrain for which an intended tire rotational direction is specified, comprising:
   a tread portion provided with a first block having a ground contacting top surface and a base cross sectional shape which is the shape of the first block at the base of the first block in a cross section parallel with the ground contacting top surface, wherein
   the ground contacting top surface has a polygonal shape having a heel-side oblique edge inclined with respect to the tire axial direction,
   the base cross sectional shape is a polygon having a heel-side axial edge extending in the tire axial direction,
   in the top view of the first block, an angle θa formed between the heel-side oblique edge and the heel-side axial edge is in a range from 5 to 45 degrees,
   the polygonal shape of the ground contacting top surface and the polygon of the base cross sectional shape are the same in the number of sides, and the first block has a portion twisted gradually from the ground contacting top surface toward the radially inside,
   a first cross section of the first block being parallel with the ground contacting top surface at ⅓ of the height of the first block, and a second cross section of the first block being parallel with the ground contacting top surface at ⅔ of the height of the first block, respectively have polygonal shapes which are the same in the number of sides as the base cross sectional shape,
   the first block has a heel-side side surface which extends from the heel-side oblique edge to the heel-side axial edge, while defining a first virtual edge of the first cross section in the heel-side side surface and a second virtual edge of the second cross section in the heel-side side surface, and
   in the top view of the first block,
      the first virtual edge is inclined with respect to the heel-side axial edge at an angle θb smaller than the angle θa,
      the second virtual edge is inclined with respect to the heel-side axial edge at an angle θc smaller than the angle θa and large than the angle θb, and
      a difference θc−θb between the angle θc and the angle θb is greater than the angle θb.

2. The tire according to claim 1, wherein
a difference θa−θc between the angle θa and the angle θc is greater than the difference θc−θb.

3. The tire according to claim 2, wherein
the difference θc−θb and the difference θa−θc are not more than 10 degrees.

* * * * *